United States Patent
Rich

Patent Number: 5,414,581
Date of Patent: May 9, 1995

[54] TAPE CASSETTE WITH V-SHAPED TAPE BUILD-UP AREA FOR CONTROLLING MISFEED TAPE

[75] Inventor: Richard F. Rich, Warren, Pa.

[73] Assignee: Loran Cassette & Audio Products, Warren, Pa.

[21] Appl. No.: 154,528

[22] Filed: Nov. 19, 1993

[51] Int. Cl.$^6$ .................... G11B 23/087; G11B 15/32
[52] U.S. Cl. ................................... 360/132; 242/346
[58] Field of Search ........... 360/132; 242/346, 346.1, 242/346.2

[56] References Cited

U.S. PATENT DOCUMENTS

| | | | |
|---|---|---|---|
| 3,495,787 | 6/1967 | Wallace | 242/346 |
| 3,711,004 | 1/1973 | Beretta | 226/181 |
| 4,011,592 | 3/1977 | Kawada | 360/132 |
| 4,114,833 | 9/1978 | Liepold | 242/346 |
| 4,232,350 | 11/1980 | Ohta | 360/132 |
| 4,248,393 | 2/1981 | Mogi | 242/346.1 |
| 4,358,071 | 11/1982 | Okamura | 242/346 |
| 5,249,759 | 10/1993 | Okamura et al. | 360/132 |

FOREIGN PATENT DOCUMENTS

| | | |
|---|---|---|
| 2709142 | 9/1978 | Germany . |
| 3113390 | 10/1982 | Germany . |
| 60-109077 | 6/1985 | Japan ............ 360/132 |
| 7810894 | 4/1979 | Netherlands . |

*Primary Examiner*—John H. Wolff
*Assistant Examiner*—Kevin M. Walkins
*Attorney, Agent, or Firm*—Oliff & Berridge

[57] ABSTRACT

A tape cassette for insertion into a tape deck to control misfeed tape includes a guide bracket mounted within a housing of the tape cassette to guide the tape along a tape feed direction between hubs. The guide bracket includes at least a V-shaped tape build-up area that is angled away from the tape to provide an area for build-up of loops of the misfeed tape. In addition, a curved rib can be included on the guide bracket to assist in the build-up of misfeed tape in the form of loops in the V-shaped tape build-up area. Also, a straight rib can be provided on the guide bracket to deflect tape that passes by the curved rib entering into a capstan chamber, back into the V-shaped tape build-up area. In accordance with the invention, the loops of misfeed tape build-up in a direction towards a pinch roller so that the pinch roller is pressed out of engagement with the capstan to stop the feeding of tape and prevent escape of misfeed tape out of the cassette.

12 Claims, 7 Drawing Sheets

TAPE CASSETTE WITH V-SHAPED TAPE BUILD-UP AREA FOR CONTROLLING MISFEED TAPE

FIELD OF THE INVENTION

The invention relates generally to tape cassettes. More particularly, this invention relates to the control of misfeed tape to keep the misfeed tape within a tape cassette when the tape cassette is engaged in a tape deck.

BACKGROUND OF THE INVENTION

When tape in an audio cassette jams, it is usually due to slack tape in the cassette. The presence of slack tape is not always visually apparent and is often caused by failure to properly store the cassettes in boxes that have tabs to lock the hubs that carry the coils of tape. When the hubs are not locked, the coil of tape within the cassette tends to unwind inside the cassette housing. Ordinarily, when a user inserts a tape cassette in a tape deck, the pinch roller and the capstan trap the tape therebetween and start pushing the tape towards the take-up hub and the hub, which turns faster than the capstan, will always keep the tape taut. However, when there is a build-up of slack tape on the take-up side of the cassette, the pinch roller and the capstan will tend to start pushing the tape out of its normal feed path while it is waiting for the take-up hub to wind all the slack out of the coil of tape. It is during this time period when most tape jams occur.

During a tape jam, the tape usually starts to build-up in an area between the nip (between the capstan and pinch roller) and one of the hubs. After a few loops of tape form in this area, a loop of tape will take one of two paths. First, it will shoot out past the pinch roller and start dumping tape into the mechanical workings of the tape deck. See for example, prior art FIG. 3. This can lead to a situation where the tape will jam the mechanical workings of the tape deck, requiring that the tape deck be serviced to have the tape and cassette properly removed. The second path that the tape may take is to work its way back into the capstan area in front of the capstan. When this happens, the capstan will grab the tape loop along with additional tape from the supply hub of coiled tape and cause a "capstan wrap" jam. This is shown, for example, in prior art FIG. 4. This type of jam will also require service because the cassette is locked on the capstan by the tape and cannot be ejected from the tape deck.

U.S. Pat. No. 4,232,350 issued to Ohta discloses a shield member 20 positioned between a guide bracket 19' and guide pin 18' within the cassette housing. Upon loosening of the turns of tape making up a tape coil, the shield member prevents contact of a guide roller 16' with the outermost loosened turn. Nevertheless, the bracket guide 19' associated with the capstan is of standard construction and is in parallel spaced relationship with the tape feed path.

Dutch Patent 7,810,894 to Geva discloses a tape cassette where jamming of the tape at the transfer from one side to the other is prevented by a slanting ridge 5 of a length such that the slot 6 formed between the slanting ridge and the side of the cassette will only be approximately 1 millimeter. The guide bracket 1 associated with the capstan is of standard construction and is positioned parallel to the tape feed path.

SUMMARY OF THE INVENTION

Accordingly, it is a primary object of the invention to control tape so that a tape jam is contained primarily within the tape cassette housing.

Another object of the invention is to avoid tape jams associated with the pinch roller and the capstan.

Another object of the invention is to direct the misfeed tape to build-up in the form of loops in a tape build-up area within the cassette.

Another object of the invention is to direct the folds of misfeed tape building up in the tape build-up area in a direction toward the pinch roller.

Another object of the invention is to deflect stray misfeed tape that enters into a capstan chamber, back into the tape build-up area.

Another object of the invention is to disengage the pinch roller from the capstan so that no more tape will feed into the jam.

The foregoing objects are attained by the present invention, which pertains to a tape cassette for insertion into a tape deck. The tape cassette housing has openings for receiving at least a pinch roller, a head and a capstan. When the tape cassette is engaged with the tape deck, a nip formed between the capstan and the pinch roller drives the tape within the tape cassette. The tape travels within the cassette in a tape feed direction between rotatable hubs and through the nip. A guide bracket is mounted within the housing of the cassette for guiding the tape on opposite sides of the nip in the tape feed direction. In particular, the guide bracket has extensions, which support tape guides for guiding the tape along the tape path. One of the extensions comprises an arm extending away from the tape at an angle to the tape feed direction and another arm extends toward the tape to position the tape guide against the tape. The arms are joined by an elbow to define a V-shaped misfeed tape build-up area for storing misfeed tape within the housing. In addition, a curved rib and a straight rib are provided on the guide bracket to guide and deflect misfeed tape toward the tape build-up area.

Other objects, advantages and salient features of the invention will become apparent from the following detailed description, which, when taken in conjunction with the annexed drawings, discloses preferred embodiments of the invention.

BRIEF DESCRIPTION OF THE DRAWINGS

Referring now to the drawings which form a part of this original disclosure.

DETAILED DESCRIPTION OF PREFERRED EMBODIMENTS

Figure 1:
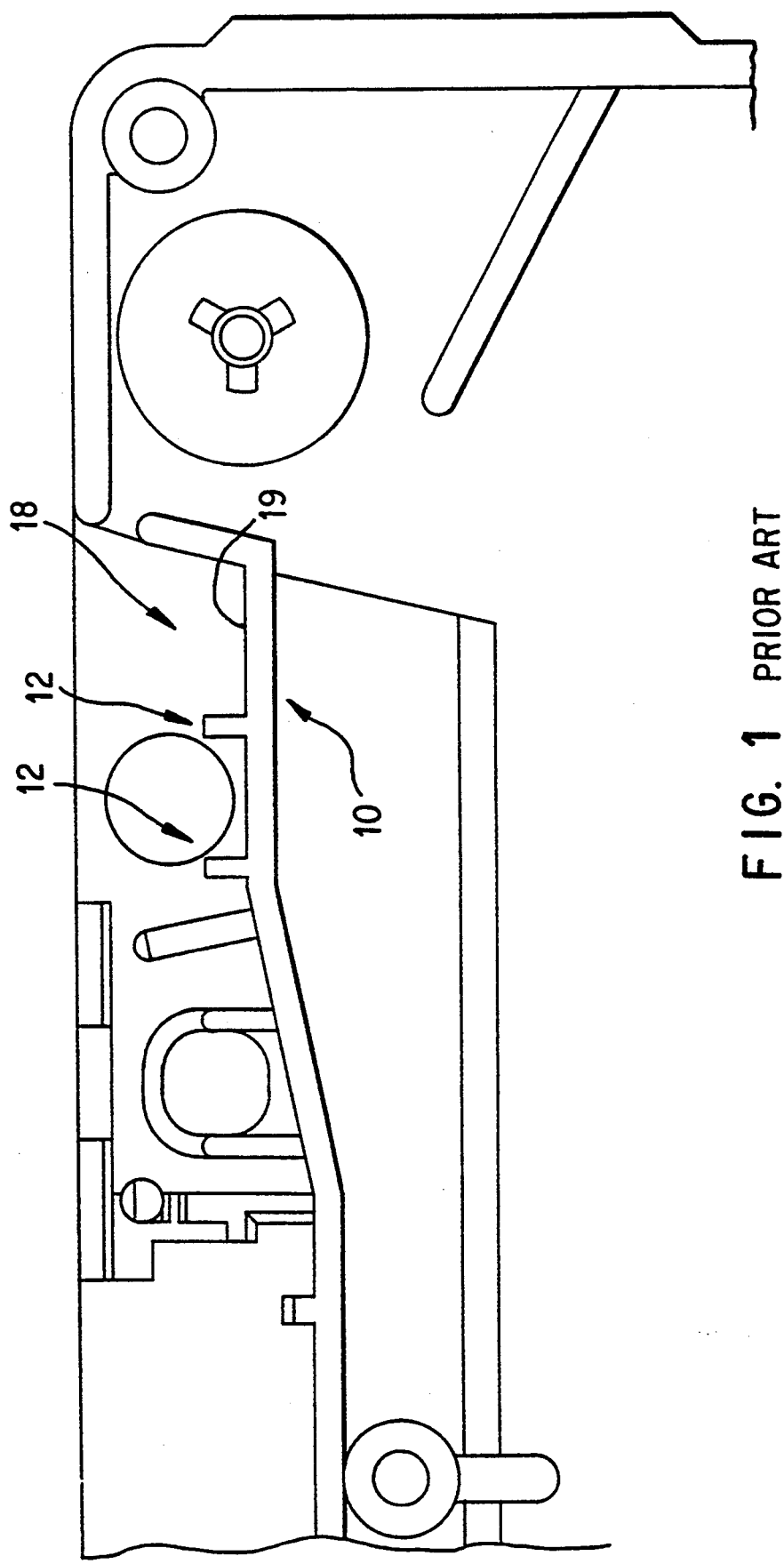
FIG. 1 is a top interior view of a portion of a cassette housing including a prior art guide bracket.
Figure 2:
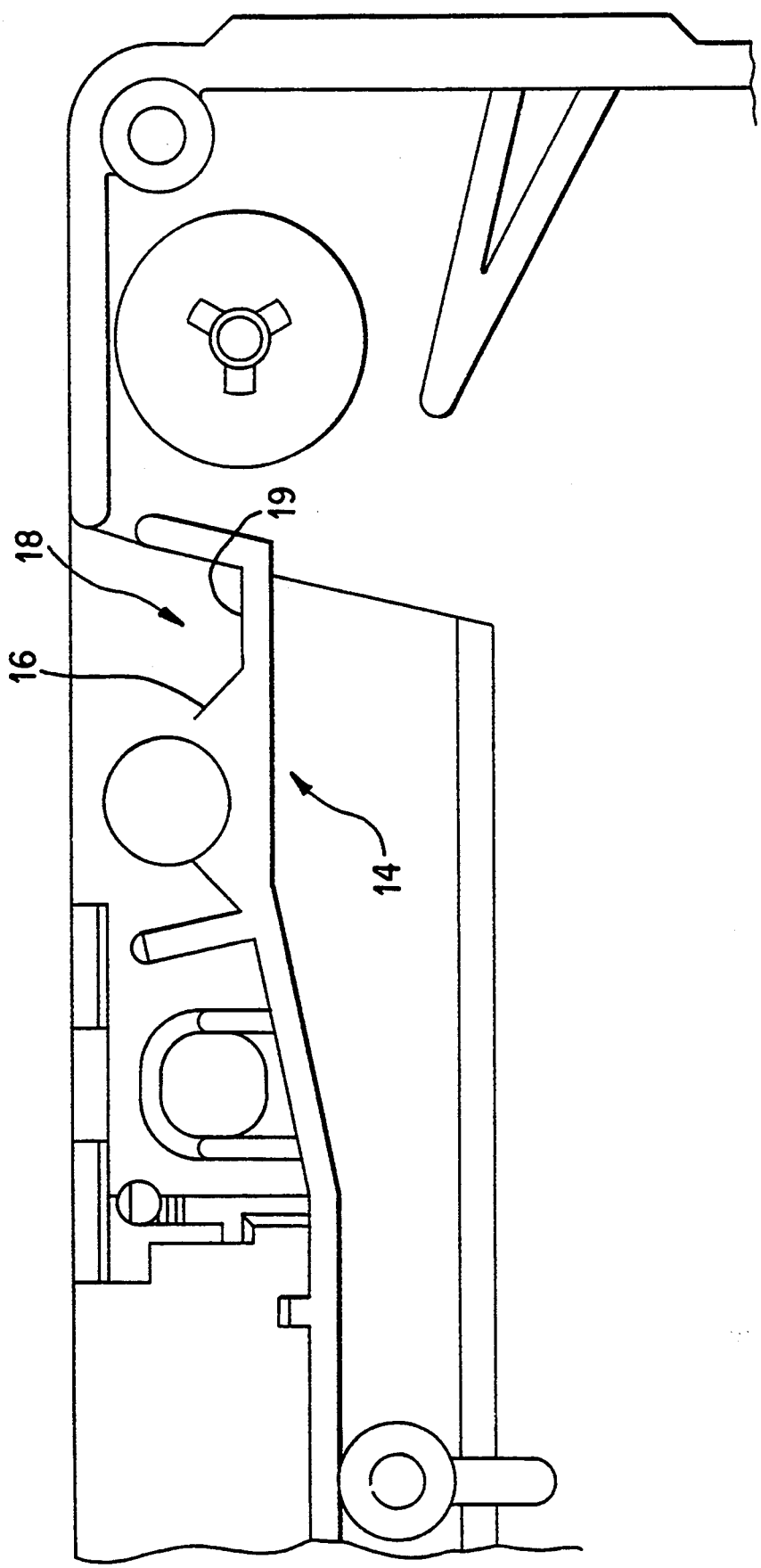
FIG. 2 is another top interior view of a portion of a cassette housing including another prior art guide bracket.

FIGS. 1 and 2 show prior art guide brackets 10 and 14 where guide bracket 10 includes ribs 12 and guide bracket 14 has a rib profile 16. Both guide brackets 10 and 14 in FIGS. 1–2 have tape build-up areas 18 with surfaces 19 in parallel with the direction of the operational tape path.

Figure 3:
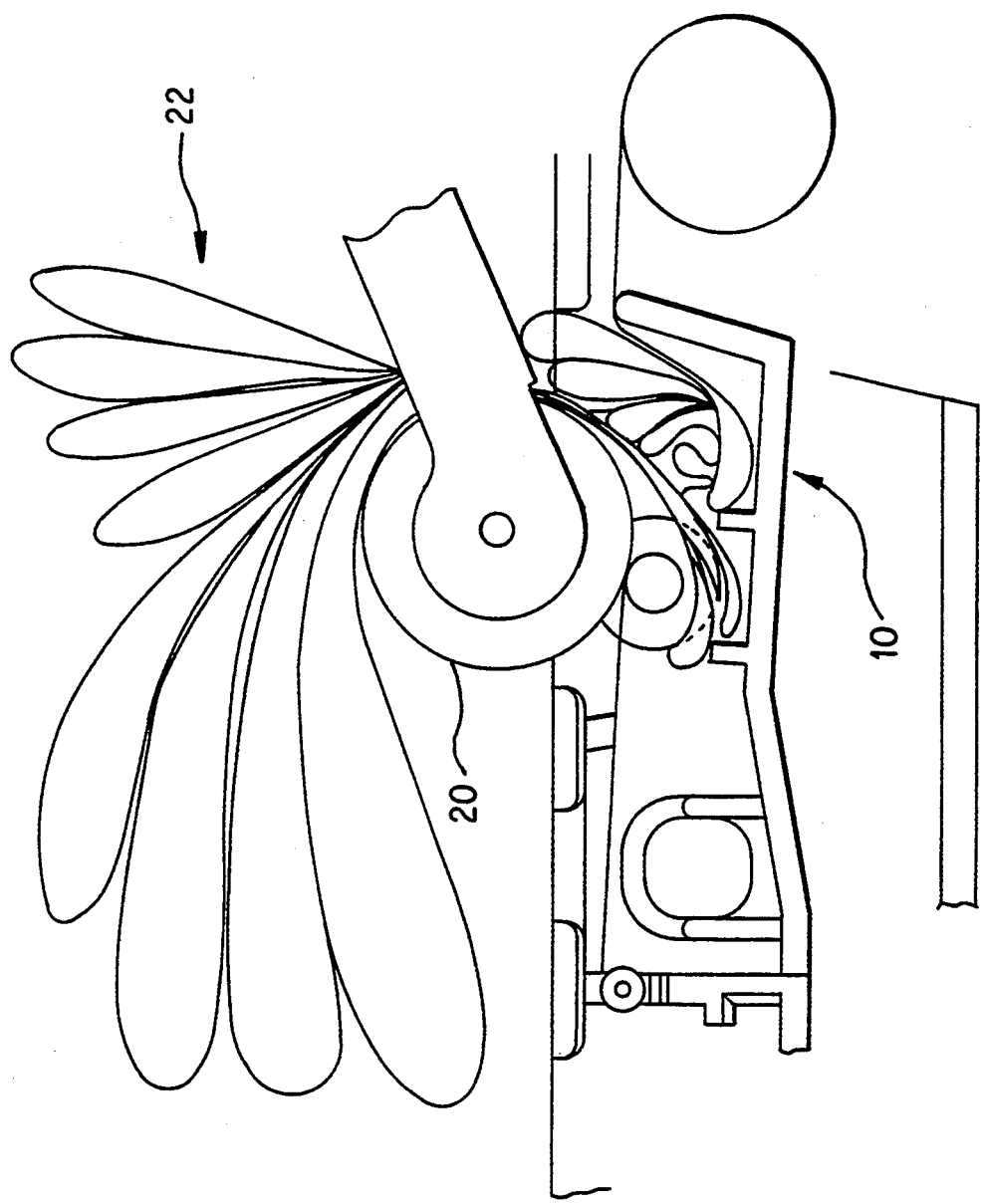
FIG. 3 is a top interior view of a tape jam where tape escapes out past a pinch roller in accordance with a prior art guide bracket.
Figure 4:
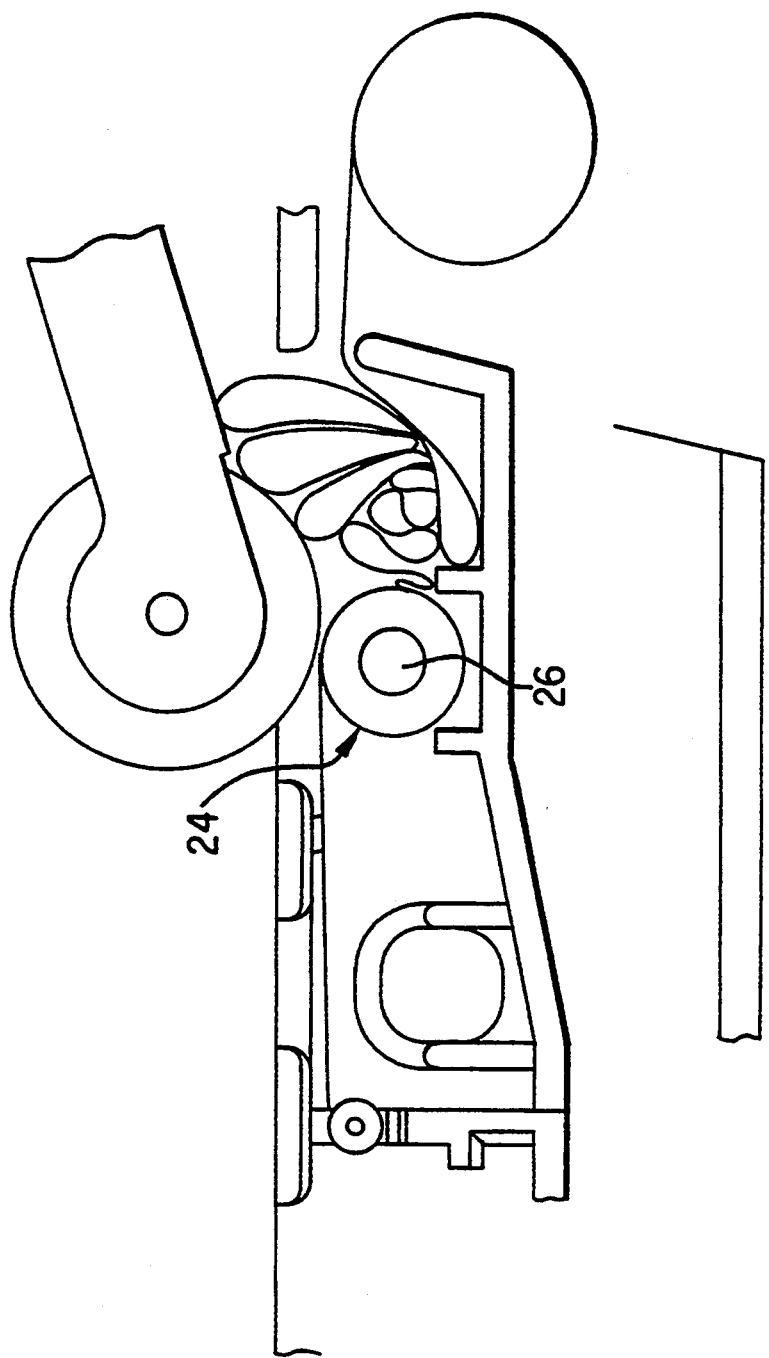
FIG. 4 is a top interior view of a tape jam where the tape is wrapped around the capstan in accordance with a prior art guide bracket.

FIG. 3 shows a tape jam where misfeed tape 22 escapes out past a pinch roller 20. FIG. 4 shows another embodiment in accordance with prior art guide brackets where misfeed tape 24 surrounds a capstan 26 by continuous wrapping of the misfeed tape. The tape jams in FIGS. 3–4 are undesirable because the tape deck requires service to remove the jammed cassette. It is more desirable to keep the misfeed tape within the cassette so the tape deck is not affected by the tape jam and so the tape having limited, if any, damage can be easily rewound back onto the hubs in the cassette.

Figure 5:
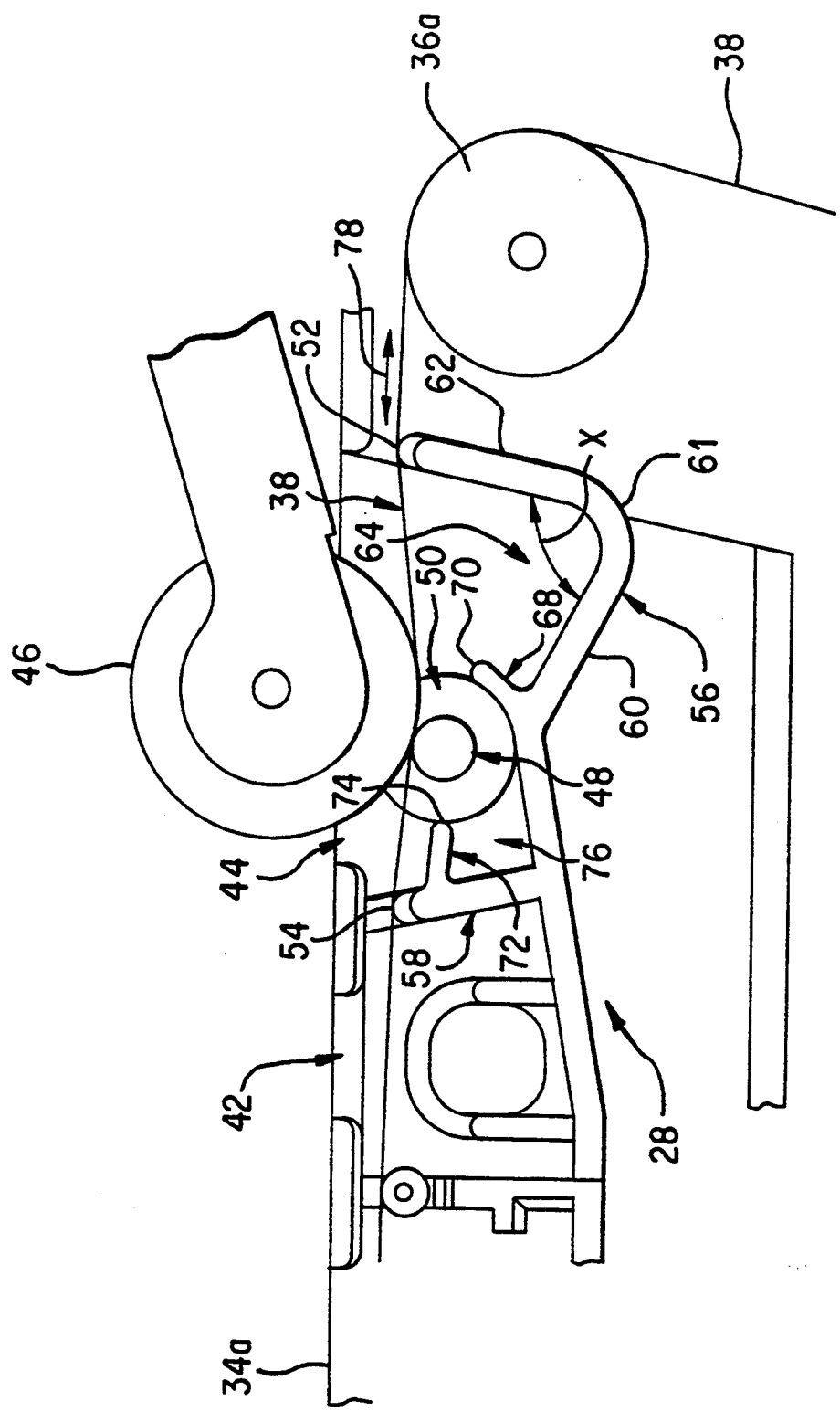
FIG. 5 is a top view of an operational feed path of a tape through a cassette using a guide bracket in accordance with a preferred embodiment of the invention.
Figure 6:
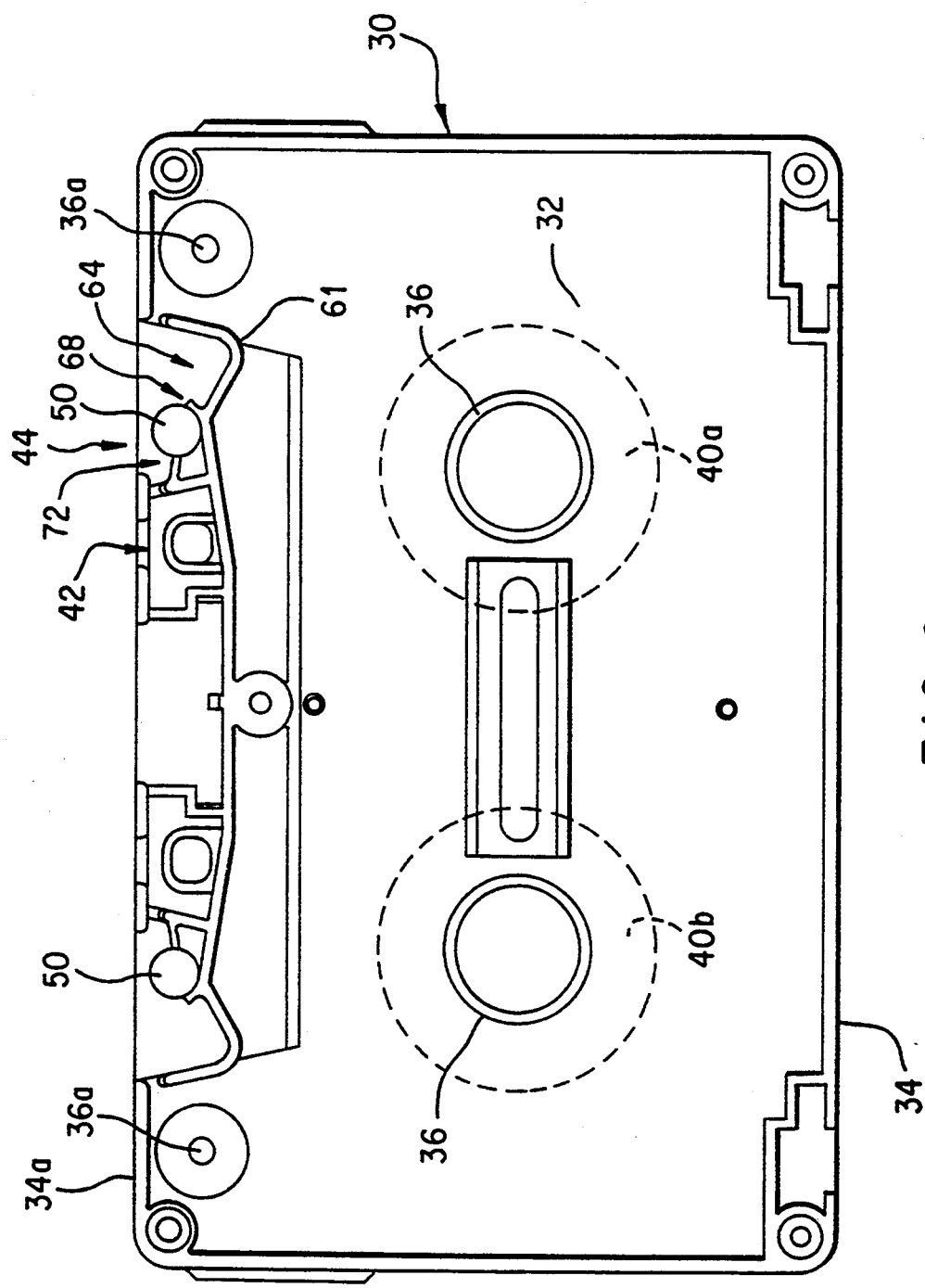
FIG. 6 is a top view of an inside of a housing of a cassette showing a preferred embodiment of a guide bracket in accordance with the invention.
Figure 7:
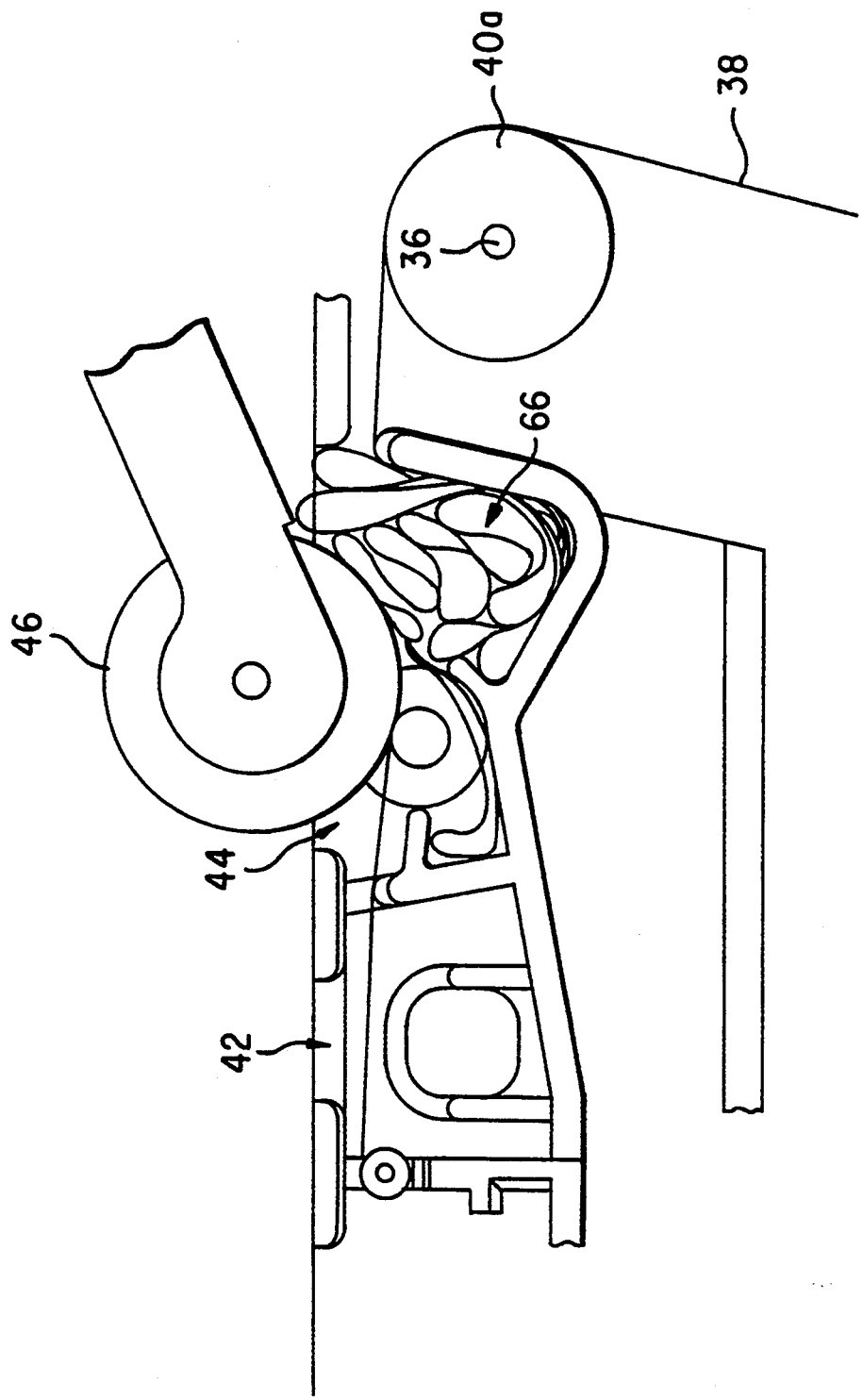
FIG. 7 is a top view of a preferred embodiment of a guide bracket in accordance with the invention showing the control of loops of misfeed tape in accordance with a preferred embodiment of the invention.

FIGS. 5–7 illustrate a preferred embodiment of the invention. FIGS. 5 and 6 incorporate a guide bracket 28 in accordance with the invention into a cassette housing 30. Any conventional cassette housing can be used with the guide bracket. For purposes of illustration, FIG. 6 shows the cassette housing 30 to have a bottom wall 32 and a top wall (not shown) with a peripheral wall 34 extending therebetween and a pair of rotatable hubs 36 that are rotatable within the cassette housing 30. A tape 38 is connected at its ends to the rotatable hubs 36, and the tape forms coils 40a and 40b (shown in phantom) on the rotatable hubs. As illustrated in FIG. 5, a portion of the tape 38 extending between the coils 40a and 40b is guided by guide rollers 36a generally in a tape feed direction 78 through the nip and such that the tape 38 extends along a front side 34a of peripheral wall 34 of the cassette housing 30.

The front side 34a of the peripheral wall 34 is formed with a number of openings, through which tape 38 is exposed. The openings include at least a head receiving opening 42 for receiving the head of a tape deck when the tape cassette is inserted into the tape deck. In addition, a pinch roller opening 44 is provided for receiving the pinch roller 46 from the tape deck when the cassette is inserted into the tape deck. In addition, a capstan hole 50 is included in the bottom wall, for example, for receiving the capstan 48.

When the cassette housing 30 is operatively positioned in a tape deck, it is within the scope of the invention to have winding spindles (not shown) extend through apertures (not shown) in the bottom wall 32 of the cassette housing 30 for engagement with the hubs to drive the tape 38. In addition, the pinch roller 46, which extends through the pinch roller opening 44, presses the tape 38 against the capstan 48 projecting upwardly through a capstan hole 50 in at least, for example, the bottom wall 32. The pinch roller 46 is pivotally biased toward the capstan 48 to create a nip therebetween when in contact. The capstan is rotated for driving or transporting the tape 38 when the tape is nipped between the pinch roller 46 and the capstan 48.

The guide bracket 28 in accordance with the invention provides a guiding means for guiding the tape 38 along a path between the coils of tape 40a and 40b. The guide bracket for purposes of illustration will be discussed in accordance with one side of the guide bracket, however, as seen in FIG. 6 the guide bracket may be symmetrical or may vary slightly in construction so as to accommodate variations in cassette housings. The guide bracket includes a first extension 58 supporting a first tape guide 54 in an area on a first side of the nip, between the capstan 48 and the head receiving opening 42. In addition, the guide bracket 28 has a second extension 56 supporting a second tape guide 52 positioned on a second side of the nip opposite from the first side in the tape feed direction and located in an area between the capstan 48 and the guide roller 36a. The tape guides 52, 54 assist in guiding the tape 38 along a path in the tape feed direction 78.

The second extension 56 on the guide bracket 28 includes a first arm 60 extending in a direction away from the tape 38 and at an angle to the tape feed direction 78. The tape feed direction 78 between the coils of tape 40a and 40b is substantially parallel to the front side 34a of the peripheral wall 34.

A second arm 62 of the second extension 56 extends toward the tape 38 and has the second tape guide 52 positioned on the end of the second arm 62 for guiding the tape 38 along a path in the tape feed direction 78 between the coils of tape 40a and 40b. The first arm 60 and the second arm 62 as seen in FIG. 5 are connected by an elbow 61, which forms an angle X between the first and second arms 60, 62. The angle in accordance with the invention can be in the range of 60°–85°, is more preferably 72°–74° and even more preferably includes an angle of 72°, 2 minutes. Accordingly, the first arm 60 and second arm 62 are angled with respect to each other in accordance with the invention to define a V-shaped area 64 for storing the build-up of misfeed tape 66 within the cassette housing 30 as seen in FIG. 7. Preferably, misfeed tape 66 is stored in the form of loops. Moreover, since the first arm 60 is angled with respect to the tape feed direction, the loops stored in the V-shaped build-up area are directed to build-up in a direction toward the pinch roller 46.

The first arm 60 further includes a curved rib 68 having a curved surface circumferentially juxtaposed to the capstan hole 50 and defines a circumferentially spaced barrier at least in part surrounding the capstan 48 in a circumferentially spaced relationship. The curved rib 68 is located on the second side of the capstan 48 between the capstan 48 and the guide roller 36a. An end of the curved rib 68 extends in a direction toward the tape. The curved rib deflects misfeed tape 66 toward the V-shaped tape build-up area 64 and inhibits misfeed tape 66 from wrapping around the capstan 48 as seen for example in the prior art FIG. 4.

The first extension 58 includes a straight rib 72 extending in a direction along the tape feed direction 78 and terminating at a distance from the capstan 48. The straight rib 72 is located on the first side of the capstan adjacent the head receiving opening 42. Preferably, the straight rib 72 has a straight rib end 74 that terminates adjacent the circumference of the hole 50 in the cassette housing 30 for receiving the capstan 48. The first extension 58 with straight rib 72 defines a capstan chamber area 76. If misfeed tape travels past the curved rib 68, the straight rib 72 will deflect the misfeed tape 66 from the capstan chamber 76 back to the V-shaped tape build-up area 64 and prevent misfeed tape from wrapping around the capstan.

FIG. 7 shows the misfeed tape 66 in a cassette having a guide bracket in accordance with a preferred embodiment of the invention.

For purposes of illustration the following description will provide an example of the use of the cassette. When the cassette is engaged in a tape deck, the pinch roller 36 engages the capstan 48 to nip the tape 38 therebetween to drive the tape 38 in the tape feed direction 78 between the rotatable hubs 36 of the cassette housing 30. By angling the V-shaped tape build-up area 64 away from the tape 38 and by locating the arms of the V-shaped tape build-up area 64 at an angle with respect to each other, the misfeed tape 66 is directed to form loops within the V-shaped tape build-up area 64. The loops of misfeed tape in accordance with the invention build-up in a direction toward the pinch roller in contrast to the prior art where misfeed tape builds up in a direction toward the capstan. The accumulating loops of misfeed tape 66 within the V-shaped tape build-up area 64 continue to build-up until the loops contact the pinch roller 46 (see FIG. 7) to urge the pinch roller 46 to pivot out of engagement (ever so slightly is sufficient) with the capstan 48 to stop driving of the tape 38, thereby maintaining the loops of misfeed tape 66 within the tape cassette. The entry of misfeed tape 66 into an area surrounding the capstan 48 is inhibited because the loops of misfeed tape 66 are deflected into the V-shaped tape build-up area 64. The curved rib 68 blocks loops of misfeed tape 66 from entering an area surrounding the capstan 48. The straight rib 72 acts to deflect misfeed tape 66 that passes by curved rib 68 into the capstan chamber area 76 and deflects the misfeed tape 66 back to the V-shaped build-up area 64.

While advantageous embodiments have been chosen to illustrate the invention, it will be understood by those skilled in the art that various changes and modifications can be made therein without departing from the scope of the invention as defined in the appended claims.

What is claimed is:

1. A tape cassette for insertion into a tape deck having a nip formed between a capstan and a pinch roller pivotally biased toward the capstan, to drive tape within the tape cassette past a head of the tape deck, the tape cassette comprising:

a housing having top and bottom walls and a peripheral wall therebetween, the peripheral wall having a first opening for receiving the pinch roller and a second opening for receiving the head, at least one of the top and bottom walls having an aperture for receiving the capstan in a position opposite the first opening to locate the tape in the nip between the capstan and pinch roller;

a pair of hubs rotatable within the housing for feeding and taking-up the tape with ends of the tape being attached to the hubs such that the tape travels between the hubs and in a tape feed direction through the nip;

a guide bracket mounted within the housing for guiding the tape on opposite sides of the nip in the tape feed direction, the guide bracket including a first extension supporting a first tape guide on a first side of the nip between the capstan and the second opening and a second extension supporting a second tape guide on a second side of the nip opposite from the first side;

the second extension including a first arm extending away from the tape at an angle to the tape feed direction and a second arm extending toward the tape to position the second tape guide against the tape, the first and second arms defining a V-shaped misfeed tape build-up area for storing misfeed tape within the housing; and the first arm including a curved rib projecting from the first arm and toward the second tape guide and having a curved surface partially circumferentially spaced from the capstan on the second side of the capstan for deflecting the misfeed tape toward the V-shaped misfeed tape storage area and inhibiting misfeed tape from wrapping around the capstan.

2. The tape cassette as in claim 1, wherein an area between the first tape guide and the capstan is a capstan chamber and the first extension includes a straight rib extending in the tape feed direction and terminating adjacent to a circumference of the aperture for receiving the capstan on the first side of the capstan, the straight rib deflecting misfeed tape that enters into the capstan chamber back into the tape build-up area.

3. The tape cassette of claim 1, wherein the first and second arms of the V-shaped misfeed tape build-up area are connected by an elbow defining an angle between the first and second arms, the elbow and first and second arms allowing loops of misfeed tape to accumulate in the V-shaped misfeed tape build-up area until the loops contact the pinch roller and urge it out of engagement with the capstan to stop driving of the tape.

4. A tape transport apparatus comprising in combination a tape deck and tape cassette, the tape deck having a nip formed between a capstan and a pinch roller pivotally biased toward the capstan, to drive tape within the tape cassette past a head of the tape deck, the tape cassette comprising:

a housing having top and bottom walls and a peripheral wall therebetween, the peripheral wall having a first opening for receiving the pinch roller and a second opening for receiving the head, at least one of the top and bottom walls having an aperture for receiving the capstan in a position opposite the first opening to locate the tape in the nip between the capstan and pinch roller;

a pair of hubs rotatable within the housing for feeding and taking-up the tape with ends of the tape being attached to the hubs such that the tape travels between the hubs and in a tape feed direction through the nip;

a guide bracket mounted within the housing for guiding the tape on opposite sides of the nip in the tape feed direction, the guide bracket including a first extension supporting a first tape guide on a first side of the nip between the capstan and the second opening and a second extension supporting a second tape guide on a second side of the nip opposite from the first side;

the second extension including a first arm extending away from the tape at an angle to the tape feed direction and a second arm extending toward the tape to position the second tape guide against the tape, the first and second arms defining a V-shaped misfeed tape build-up area for storing misfeed tape within the housing; and the first arm including a curved rib projecting from the first arm and toward the second tape guide and having a curved surface partially circumferentially spaced from the capstan on the second side of the capstan for deflecting the misfeed tape toward the V-shaped misfeed tape storage area and inhibiting misfeed tape from wrapping around the capstan.

5. The tape transport system of claim 4, wherein a capstan chamber is defined between the first tape guide and the capstan, and the first extension includes a straight rib extending in the tape feed direction and terminating adjacent to a circumference of the aperture for receiving the capstan on the first side of the capstan, the straight rib deflecting misfeed tape passing the curved rib out of the capstan chamber and back into the tape build-up area.

6. The tape transport system of claim 4, wherein the first and second arms of the V-shaped misfeed tape build-up area are connected by an elbow defining an angle between the first and second arms, the elbow and first and second arms allowing loops of misfeed tape to accumulate in the V-shaped misfeed tape build-up area until the loops contact the pinch roller and urge it out of engagement with the capstan to stop driving of the tape.

7. A method for containing misfeed tape within a tape cassette, comprising the steps of:

driving tape in a tape feed direction between two hubs of a tape cassette by passing the tape in a nip between a capstan and a pinch roller pivotally biased toward the capstan;

angling a tape build-up area away from the tape by forming the tape build-up area with a first arm that extends at an angle away from the tape feed direction and a second arm extending from the first arm toward the tape;

projecting a curved rib from the first arm around a circumferentially spaced portion of the capstan to block loops of misfeed tape from entering between the capstan and curved rib;

inhibiting entry of misfeed tape into an area surrounding the capstan by deflecting loops of misfeed tape into the tape build-up area; and accumulating loops of misfeed tape within the tape build-up area until the loops contact the pinch roller to urge the pinch roller out of engagement with the capstan to stop driving the tape, thereby maintaining the loops of misfeed tape within the tape cassette.

8. The method of claim 7, wherein the inhibiting step further includes the step of projecting a straight rib toward the capstan on a side of the capstan opposite from the curved rib, the straight rib deflecting misfeed tape which passes the curved rib back to the V-shaped misfeed tape build-up area.

9. A tape cassette for insertion into a tape deck having a nip formed between a capstan and a pinch roller pivotally biased toward the capstan, to drive tape within the tape cassette past a head of the tape deck, the tape cassette comprising:

a housing having top and bottom walls and a peripheral wall therebetween, a peripheral wall having a first opening for receiving the pinch roller and a second opening for receiving the head, at least one of the top and bottom walls having an aperture for receiving the capstan in a position opposite the first opening to locate the tape in the nip between the capstan and the pinch roller, the nip having a first side in the tape feed direction adjacent the first opening, and a second side opposite the first side;

a pair of hubs rotatable within the housing for feeding and taking up the tape with ends of the tape being attached to the hubs such that the tape travels between the hubs and in a tape feed direction through the nip;

a guide bracket mounted within the housing for guiding the tape on opposite sides of the nip in the tape feed direction, the guide bracket having an extension supporting a tape guide on the second side of the nip;

the extension including a first arm extending away from the tape at an angle to the tape feed direction and a second arm extending toward the tape to position the tape guide against the tape, the first and second arms defining a V-shaped misfeed tape build-up area for accumulating misfeed tape within the housing, wherein the accumulation of misfeed tape is in a direction toward the pinch roller; and the first arm including a curved rib projecting from the first arm and toward the second tape guide and having a curved surface partially circumferentially spaced from the capstan on the second side of the capstan for deflecting the misfeed tape toward the V-shaped misfeed tape storage area and inhibiting misfeed tape from wrapping around the capstan.

10. The tape cassette according to claim 9, wherein the first and second arms of the V-shaped misfeed build-up area are connected by an elbow defining an angle between first and second arms, the elbow and first and second arms allowing loops of misfeed tape to accumulate in the V-shaped misfeed tape build-up area until the loops contact the pinch roller and urge it out of engagement with the capstan to stop driving of the tape.

11. The tape cassette of claim 10, wherein the angle defined by the elbow is between 60° and 85°.

12. The tape cassette of claim 11, wherein the angle is 72° to 74°.

* * * * *